United States Patent
Niwa

(10) Patent No.: US 7,645,187 B2
(45) Date of Patent: Jan. 12, 2010

(54) AIR-CONDITIONING DUCT

(75) Inventor: Kenji Niwa, Aichi-Ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 546 days.

(21) Appl. No.: 11/392,741

(22) Filed: Mar. 30, 2006

(65) Prior Publication Data
US 2006/0223432 A1 Oct. 5, 2006

(30) Foreign Application Priority Data
Apr. 4, 2005 (JP) ............................. 2005-107778

(51) Int. Cl.
B60H 1/30 (2006.01)
(52) U.S. Cl. ....................................... 454/147
(58) Field of Classification Search ................... 454/147
See application file for complete search history.

(56) References Cited
FOREIGN PATENT DOCUMENTS

JP  A-2003-170762  6/2003
JP  A-2003-326942  11/2003

Primary Examiner—Steve McAllister
Assistant Examiner—Helena Kosanovic
(74) Attorney, Agent, or Firm—Posz Law Group, PLC

(57) ABSTRACT

An air-conditioning duct is provided inside a car console box that has an ornamental portion. The duct has an air passage for conducting conditioned air from an air conditioner to the passenger compartment. The air passage is defined by a first wall portion formed by the ornamental portion, a second wall portion opposed to the first wall portion, a third wall portion located between the first and the second wall portions, and a fourth wall portion located between the first and the second wall portions. The fourth wall portion is opposed to the third wall portion. Each wall portion has an inner surface exposed to the interior of the air passage. A pair of boundary lines are defined on the inner surface of the first wall portion at boundaries between the first wall portion and the third and fourth wall portions. A dew condensation suppression portion is provided on the inner surface of the first wall portion between the pair of the boundary lines. A space is defined between the dew condensation suppression portion and each boundary line. When the thickness of the dew condensation suppression portion on the first wall portion is expressed by T (mm), and the sum of the widths of the spaces is expressed by D (mm), the thickness T and the sum D of the widths satisfy the following expression (1).

$$T \geq D+2 \text{ mm} (D>0 \text{ mm}) \quad (1)$$

7 Claims, 3 Drawing Sheets

AIR-CONDITIONING DUCT

BACKGROUND OF THE INVENTION

The present invention relates to an air-conditioning duct that is located inside an automobile interior part such as a console box and an instrument panel.

Conventionally, a vehicle has air-conditioning ducts for conveying air from an air conditioner. Such ducts are often located inside interior parts such as a console box and an instrument panel. When an air-conditioning duct is arranged inside an automobile interior part, dew condensation can occur on the surface (ornamental surface) of the interior part due to the temperature difference between the interior of the air-conditioning duct (air passage) and the exterior (the interior of the passenger compartment). Accordingly, a countermeasure has been taken to prevent formation of dew condensation by forming a backside of an automobile part to be heat-insulated.

For example, in an instrument panel disclosed in Japanese Laid-Open Patent Publication No. 2003-170762, a portion inside a predetermined position located at an opening of an air-conditioning duct is made thicker than the remainder of the instrument panel. A foam portion (a dew condensation suppression portion) is formed in the thick portion. The foam portion is formed in the following manner. First, a forming material containing a blowing agent is injected into a cavity of a mold. Then, the thickness (volume) of the cavity is partly expanded to lower the pressure. This causes the blowing agent to produce foam. The foam portion increases the heat insulating property of the predetermined portion. This suppresses the formation of dew condensation on the surface of the instrument panel.

Japanese Laid-Open Patent Publication No. 2003-326942 discloses a configuration of an instrument panel in which urethane material is sprayed to a portion about an air outlet using a spray gun. Utilizing the adhesion of the urethane material when it is hardened, the duct is coupled to the instrument panel. A urethane layer (dew condensation suppression portion) formed by hardening the urethane material increases the heat insulating property about the air outlet. This suppresses the formation of dew condensation on the surface of the instrument panel.

To efficiently improve the heat insulation property of an automobile interior part, a dew condensation suppression portion is preferably formed evenly in the entire area of a predetermined portion that forms part of an air passage. That is, if an automobile interior part has uneven sections such as salient corners and steps, the dew condensation suppression portion is preferably formed along the uneven portions. However, when adopting such a configuration, since Japanese Laid-Open Patent Publication No. 2003-170762 forms a dew condensation suppression portion by injection molding during the molding of an instrument panel, a mold having a complicated shape needs to be used. This increases the manufacturing costs. On the other hand, in the configuration of Japanese Laid-Open Patent Publication No. 2003-326942, since the urethane material is manually sprayed using a spray gun, it is difficult to evenly spray the material along the uneven portion. Such spraying of urethane material is thus troublesome. In addition, it is highly likely that the sprayed amount of the urethane material varies among the products, which can result in wasted material.

Accordingly, to eliminate the increase of manufacturing costs, waste of material, and the complexity of manufacturing procedures that accompany the forming of such a dew condensation suppression portion (the foam portion in Japanese Laid-Open Patent Publication No. 2003-170762, and the urethane layer in Japanese Laid-Open Patent Publication No. 2003-326942) in an automobile interior part, a method has been proposed in which a dew condensation suppression portion is formed in a position that is as spaced as possible from uneven portions, that is, the space adjacent to the dew condensation suppression portion is maximized. However, in a configuration where the space between a dew condensation suppression portion and an uneven portion is maximized, an area in the predetermined portion that is occupied by the dew condensation suppression portion is reduced. This is likely to reduce the heat insulation property of the interior part. Therefore, in terms of improving the heat insulation property, the space adjacent to the dew condensation suppression portion is preferably minimized.

As described above, in case of an automobile interior part provided with a dew condensation suppression portion, there are two contradicting demands, that is, a demand for forming a space adjacent to the dew condensation suppression portion for eliminating the difficulty of forming the dew condensation suppression portion, and a demand for eliminating such space for improving the heat insulation property.

SUMMARY OF THE INVENTION

Accordingly, it is an objective of the present invention to provide an air-conditioning duct that reliably suppresses the dew condensation on an automobile interior part, while facilitating the forming of the dew condensation suppression portion.

To achieve the foregoing objective, the present invention provides an air-conditioning duct provided inside an automobile interior part that has an ornamental portion. The duct has an air passage for conducting conditioned air from an air conditioner to a passenger compartment. The duct includes a plurality of wall portions and a dew condensation suppression portion. The wall portions define the air passage. One of the wall portions is a first wall portion that is formed by the ornamental portion. Each wall portion has an inner surface exposed to the interior of the air passage. A pair of boundary lines are defined on the inner surface of the first wall portion at boundaries between the first wall portion and two of the other wall portions that are connected to the first wall portion. The dew condensation suppression portion is provided on the inner surface of the first wall portion between the pair of boundary lines. A space is defined between the dew condensation suppression portion and at least one of the boundary lines. When the thickness of the dew condensation suppression portion is expressed by T (mm), and the width of the space is expressed by d (mm), the thickness T and the width d satisfy the following expression (1).

$$T > d + 1 \text{ mm} (d > 0 \text{ mm}) \tag{1}$$

The present invention also provides another air-conditioning duct provided inside an automobile interior part that has an ornamental portion. The duct has an air passage for conducting conditioned air from an air conditioner to a passenger compartment. The duct includes a plurality of wall portions and a dew condensation suppression portion. The wall portions define the air passage. The wall portions include a first wall portion formed by the ornamental portion, a second wall portion arranged to be opposed to the first wall portion, a third wall portion located between the first wall portion and the second wall portion, and a fourth wall portion located between the first wall portion and the second wall portion. The fourth wall portion is opposed to the third wall portion. Each wall portion has an inner surface exposed to the interior of the air passage. A pair of boundary lines are defined on the inner surface of the first wall portion at boundaries between the first wall portion and the third and fourth wall portions. The dew condensation suppression portion is provided on the inner surface of the first wall portion between the pair of the boundary lines. A space is defined between the dew condensation suppression portion and each boundary line. The duct further has another a dew condensation suppression portion provided on the inner surface of the second wall portion. When the thickness of the dew condensation suppression portion on the first wall portion is expressed by T (mm), and the sum of the widths of the spaces is expressed by D (mm), the thickness T and the sum D of the widths satisfy the following expression (1).

$$T \geq D+2 \text{ mm}(D>0 \text{ mm}) \quad (1)$$

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An automobile interior part according to one embodiment of the present invention will now be described. In this embodiment the interior part is a console box 11. In the following, unless otherwise specified, the traveling direction is defined as the front, and a vertical direction is the same as the vertical direction of the vehicle.

Figure 1:
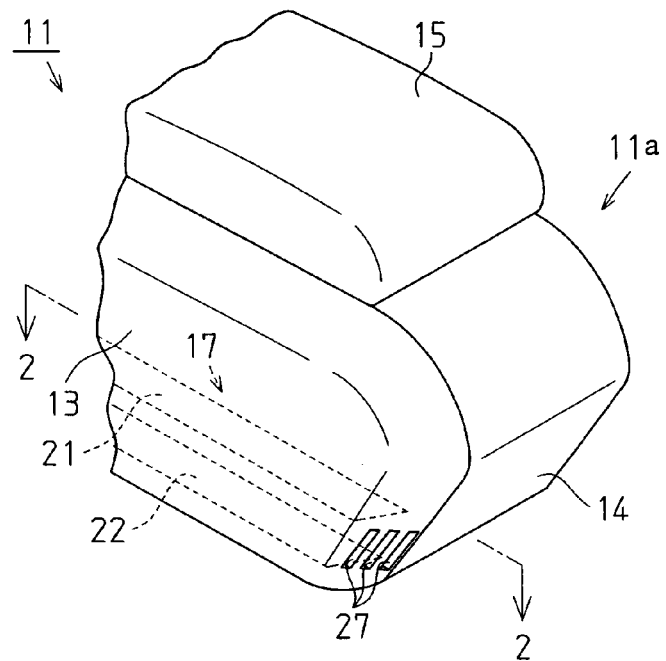
FIG. 1 is a perspective view illustrating a box main body of a console box according to one embodiment.
Figure 2:
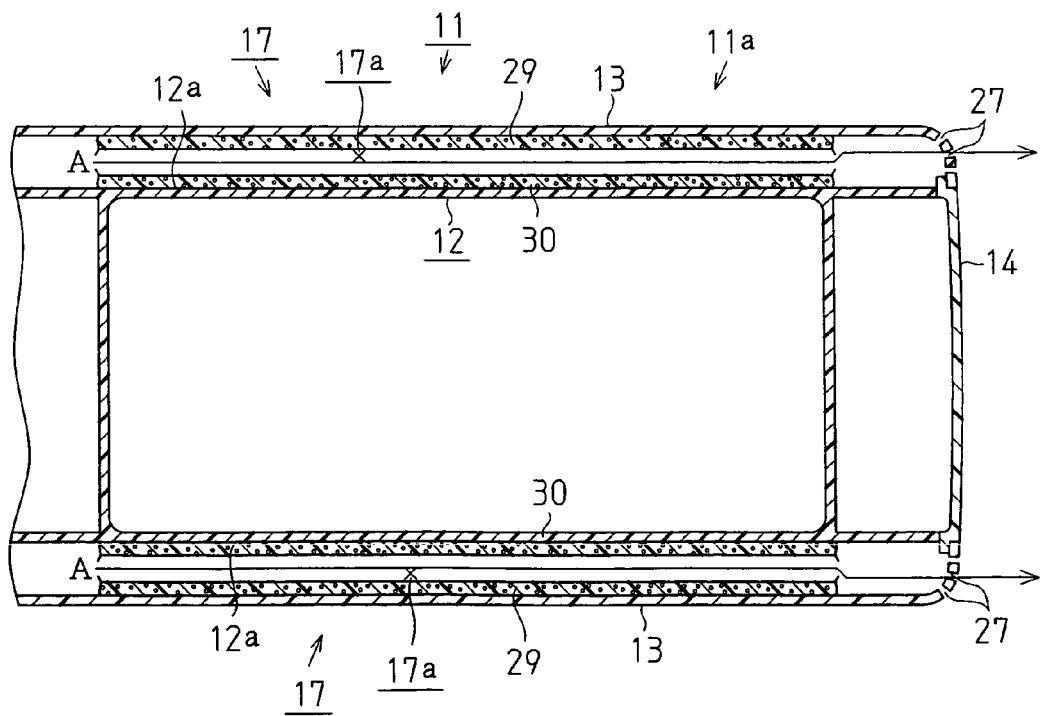
FIG. 2 is a cross-sectional view taken along line 2-2 in FIG. 1.

The console box 11, which is shown in FIGS. 1 and 2, is located between the driver's seat and the front passenger seat of a vehicle, and extends along the fore-and-aft direction. A front end of the console box 11 is coupled to a center panel (not shown) provided in a center of the passenger compartment. A rectangular resin box main body 11a is provided in a rear portion of the console box 11. A rectangular container member 12 is provided in the box main body 11a at a center.

A pair of side panels 13 that extend in the fore-and-aft direction are provided on the left and right sides of the box main body 11a. The side panels 13 are each spaced from the corresponding side wall 12a of the container member 12 by a predetermined distance and parallel to the side wall 12a. A rear panel 14 extending in the lateral direction of the vehicle is provided at the rear end of the box main body 11a. A rectangular lid 15 is provided at the upper end of the box main body 11a. The lid 15 selectively opens and closes the upper opening of the container member 12. An air-conditioning duct 17 is provided on each of the left and right sides of the box main body 11a. Specifically, each air-conditioning duct 17 is provided between one of the side panels 13 and the facing side wall of the container member 12. Hereinafter, the side panels 13, the container member 12, and the air-conditioning ducts 17 will be successively described.

In the following, only one of the side panels 13, one of the air-conditioning ducts 17, and the corresponding components are mainly described as representing the pairs.

Figure 3:
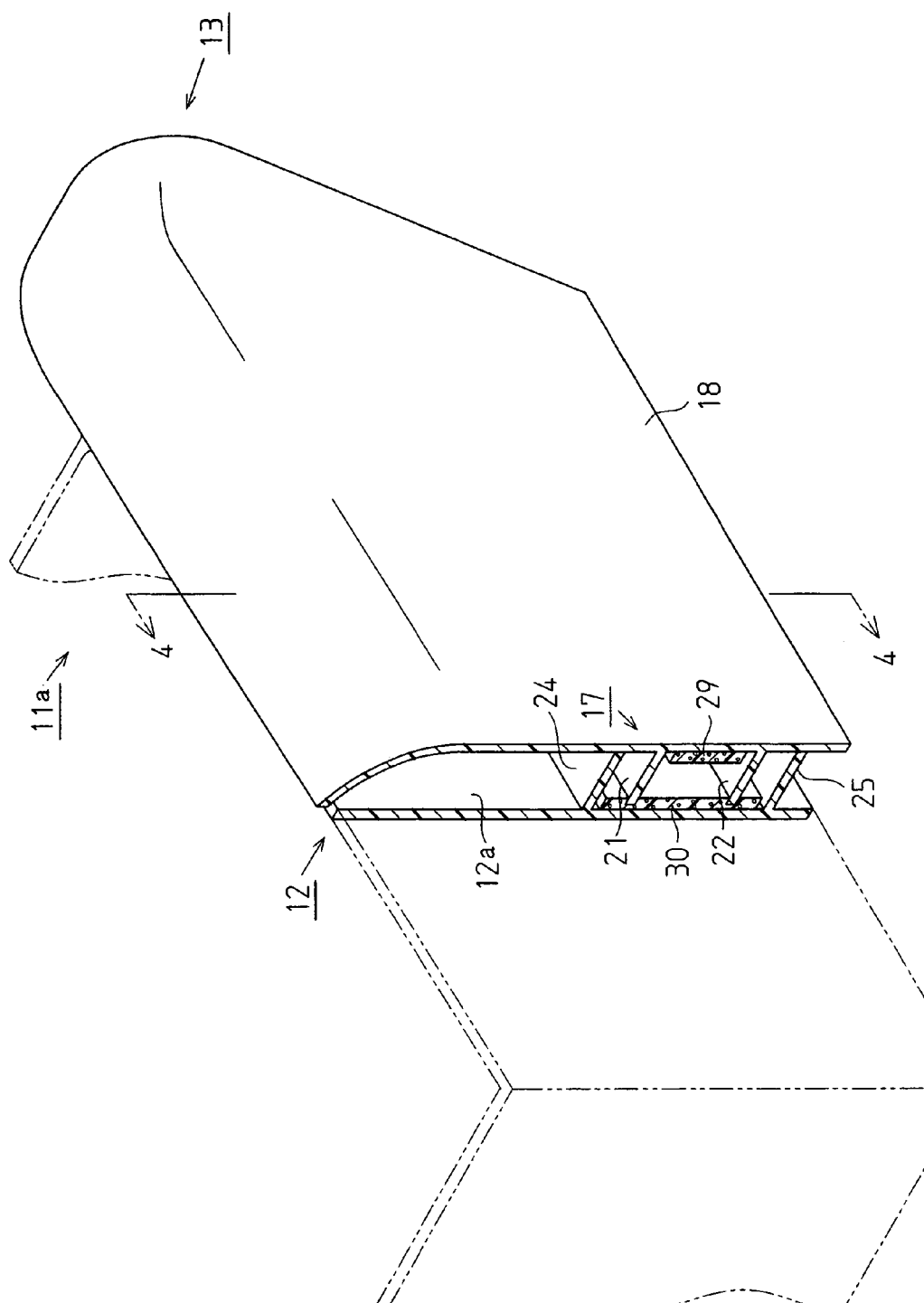
FIG. 3 is a cross-sectional perspective view illustrating an air-conditioning duct of the embodiment shown in FIG. 1.

As shown in FIG. 3, the side panel 13 has a first wall portion 18 that forms an ornamental portion of the box main body 11a. A pair of ribs 21, 22, which form third and fourth wall portions, protrudes from the first wall portion 18. In this embodiment, the upper one of the ribs 21, 22 is referred to as a first rib 21, and the lower one is referred to as a second rib 22. The ribs 21, 22 are spaced from each other with respect to the vertical direction. Each rib 21, 22 is shaped as a plate and extends along the fore-and-aft direction of the vehicle. The distal end of each of the ribs 21, 22 is welded to the side wall 12a of the container member 12 that faces the first wall portion 18. The welding may be performed by ultrasonic welding using ultrasonic vibration or high-frequency welding using high-frequency dielectric heating. Alternatively, the welding may be performed by friction welding such as vibration welding and spin welding or heating welding such as hot plate welding.

The container member 12 is used for accommodating articles. Each side wall 12a of the container member 12 form a second wall portion of the corresponding air-conditioning duct 17. A pair of ribs 24, 25 project from each side wall 12a of the container member 12. The ribs 24, 25 are spaced from each other with respect to the vertical direction. In this embodiment, the upper one of the ribs 24, 25 is referred to as a third rib 24, and the lower one is referred to as a fourth rib 25. The third rib 24 is located above the first rib 21, and the fourth rib 25 is located below the second rib 22. Each rib 24, 25 is shaped as a plate and extends along the fore-and-aft direction of the vehicle. The distal end of each of the ribs 24, 25 is welded to an inner surface 18a of the first wall portion 18 of the side panel 13 so as to press a dew condensation suppression member 30, which will be discussed below. The welding may be performed by any of the above listed methods.

The air-conditioning duct 17 is defined as a rectangular tube extending along the fore-and-aft direction by the first wall portion 18, the side wall 12a of the container member 12 serving as a second wall portion, the first rib 21 serving as a third wall portion, and the second rib 22 serving as a fourth wall portion. The interior surrounded by the first wall portion 18, the side wall 12a, the first rib 21, and the second rib 22 functions as an air passage 17a. The front end of the air-conditioning duct 17 is connected to another air-conditioning duct (not shown) extending from a vehicle air conditioner. The rear end of the air-conditioning duct 17 functions as a rear register 27. Conditioned air from the air conditioner is blown into the passenger compartment from the rear register 27 through the air-conditioning duct 17 in the box main body 11a.

Figure 4:
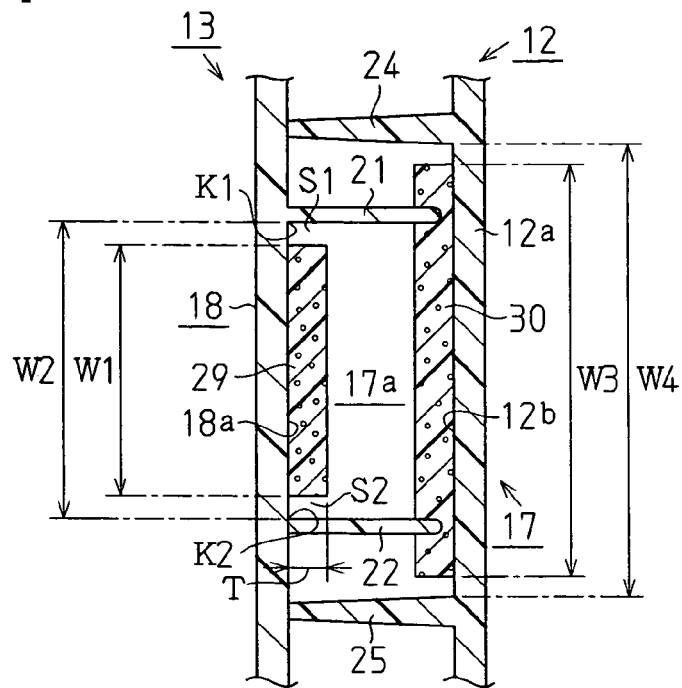
FIG. 4 is a cross-sectional view taken along line 4-4 in FIG. 3.

As shown in FIG. 4, on the inner surface 18a in the first wall portion 18 that is exposed to the air passage 17a, a boundary line K1 is defined by the first rib 21 and the first wall portion 18, and a boundary line K2 is defined by the second rib 22 and the first wall portion 18. The boundary lines K1, K2 extend along the fore-and-aft direction.

A dew condensation suppression member 29, functioning as a dew condensation suppression portion, is adhered with a two-sided tape onto the inner surface 18a of the first wall portion 18 between the boundary lines K1, K2. The dew condensation suppression member 29 promotes the heat insulation property of the first wall portion 18, and suppresses dew condensation on the first wall portion 18. The dew condensation suppression member 29 is provided on the inner surface 18a of the first wall portion 18 along the fore-and-aft direction. The width w1 of the dew condensation suppression member 29 with respect to the vertical direction, is less than a space between the facing surfaces of the first rib 21 and the second rib 22, that is, less than the width w2 of the space between the first rib 21 and the second rib 22 with respect to the vertical direction of the air-conditioning duct 17. In other words, the dew condensation suppression member 29 is narrower than the width w2 of the air-conditioning duct 17 in the vertical direction.

The dew condensation suppression member 29 is arranged such that a first space S1 and a second space S2 are defined between the member 29 and the boundary lines K1, K2, respectively. The width of the space S1 and the width of the space S2 are preferably equal to or less than 5 mm in terms of facilitating the adhering procedure of the dew condensation suppression member 29 and maintaining the heat insulation property of the first wall portion 18.

The material for the dew condensation suppression member 29 may be a porous material such as resin foam, unwoven fabric, glass wool, and rock wool. In this embodiment, resin foam is used since it has a satisfactory heat insulation property. As the resin foam, an ester polyurethane or ether polyurethane, cross-linked polyethylene or non-cross-linked polyethylene, polychloroprene, styrene-butadiene copolymer, ethylene-vinyl acetate copolymer, or polystyrene may be used alone or in combination. In terms of improving the heat insulation property, the resin foam preferably has an expansion ratio of 10 to 40 times. The resin foam may be either of an interconnected cell type of a closed cell type. An interconnected cell type resin foam, in which parts or all of the cells in the material are interconnected, is advantageous for the heat insulation property. Thus, in this embodiment, the dew condensation suppression member 29 is preferably formed of an interconnected cell type resin foam.

The thickness of the dew condensation suppression member 29 is greater than or equal to 3 mm and less than 10 mm, and preferably greater than or equal to 4 mm and less than 7 mm. If the thickness of the dew condensation suppression member 29 is less than 3 mm, a sufficient heat insulating property is not obtained. That is, the heat insulating property of the first wall portion 18 is degraded. As a result, dew condensation is likely to occur on the surface of the first wall portion 18. On the other hand, if the thickness of the dew condensation suppression member 29 is greater than or equal to 10 mm, the air passage 17a is significantly narrowed, which is likely to hinder the flow of conditioned air.

When the thickness of the dew condensation suppression member 29 is expressed by T (mm), and the width of one of the spaces the S1, S2 is expressed by d (mm), the thickness T and the width d satisfy the following expression (1).

$$T > d+1 \text{ mm}(d>0 \text{ mm}) \quad (1)$$

When the thickness of the dew condensation suppression member 29 is expressed by T (mm), and the sum of the widths of the spaces the S1, S2 is expressed by D (mm), the thickness T and the width D satisfy the following expression (2).

$$T \geq D+2 \text{ mm}(D>0 \text{ mm}) \quad (2)$$

In expression (2), the sum D of the widths of the spaces refers to the sum of the widths of the spaces S1, S2. In other words, the sum D corresponds to the difference between the width w2 of the air-conditioning duct 17 and the width w1 of the dew condensation suppression member 29.

In this embodiment, the dew condensation suppression member 30 is adhered to an inner surface 12b of the side wall 12a that is exposed to the air passage 17a. The dew condensation suppression member 30 is provided on the inner surface 12b of the side wall 12a along the fore-and-aft direction of the vehicle. The vertical width w3 of the dew condensation suppression member 30 is greater than the width w2 of the air-conditioning duct 17. That is, the dew condensation suppression member 30 is adhered to the entire section of the side wall 12a of the container member 12 that is exposed to the air passage 17a. This structure improves the heat insulating property of the side wall 12a, and thus reliably suppresses dew condensation on the outer surface of the container member 12. The vertical width w3 of the dew condensation suppression member 30 is less than the space w4 between the third rib 24 and the fourth rib 25. The dew condensation suppression member 30 is arranged such that a space exists between the member 30 and each of the third rib 24 and the fourth rib 25.

The operation of the air-conditioning duct 17 will now be described.

Prior to the installation of the box main body 11a, the dew condensation suppression members 29, 30 are adhered to the predetermined sections of the first wall portion 18 of the side panel 13 and the side wall 12a of the container member 12. Specifically, the dew condensation suppression member 29 is adhered to a section of the side panel 13 between the boundary lines K1, K2. At this time, the dew condensation suppression member 29 is arranged on the inner surface 18a of the first wall portion 18 such that the spaces S1, S2 exist between the member 29 and the boundary lines K1, K2. That is, the dew condensation suppression member 29 may be located anywhere between the boundary lines K1, K2 as long as the member 29 is spaced from the first rib 21 and the second rib 22. Therefore, when adhering the dew condensation suppression member 29, care need not be taken for preventing the dew condensation suppression member 29 from crossing the boundary lines K1, K2. Also, no procedure is required for removing sections of the dew condensation suppression member 29 that crosses the boundary lines K1, K2. The procedure of adhesion is therefore facilitated.

After adhering the dew condensation suppression member 29 to a predetermined section on the side panel 13, the side panel 13 is attached to the container member 12. Accordingly, the air-conditioning duct 17 is defined by the four wall portions 18, 12a, 21, 22. In the air-conditioning duct 17, since the dew condensation suppression member 29 is provided, the first wall portion 18 forming the air passage 17a and the side wall 12a forming the container member 12 have a heat insulating structure.

As shown in FIG. 2, conditioned air A from the air conditioner passes through the rear the air-conditioning duct 17 and is then blown into the passenger compartment (toward the backseat) through the rear register 27. At this time, in the console box 11, the dew condensation suppression member 29 is arranged such that the spaces S1, S2 exist between the member 29 and the boundary lines K1, K2. The thickness of the dew condensation suppression member 29, which is adhered to the inner surface 18a of the first wall portion 18, greater than the width of the space S1 (S2) by a predetermined amount (1 mm). That is, the thickness of the dew condensation suppression member 29 is determined taking consideration of the size of the spaces and in terms of obtaining a satisfactory heat insulating property. Accordingly, despite the fact that the spaces S1, S2 are provided in the first wall portion 18, the dew condensation suppression member 29 has a sufficient heat insulating property, and dew condensation on the surface of the first wall portion 18 is suppressed.

Further, the dew condensation suppression member 30 is adhered to the entire section of the side wall 12a that is exposed to the air passage 17a. This prevents the heat insulating property of the side wall 12a is prevented from being degraded. Thus, dew condensation on the outer surface of the container member 12 is suppressed.

The above embodiment has the following advantages.

The dew condensation suppression member 29 is arranged on the inner surface 18a of the first wall portion 18 such that the spaces S1, S2 exist between the member 29 and the boundary lines K1, K2. Therefore, when providing the dew condensation suppression member 29 at a predetermined section of the first wall portion 18, care need not be taken for preventing the dew condensation suppression member 29 from crossing the boundary lines K1, K2. Also, no procedure is required for removing sections of the dew condensation suppression member 29 that crosses the boundary lines K1, K2. That is, no troublesome procedure is required for accurately aligning the upper and lower edges of the dew condensation suppression member 29 with the boundary lines K1, K2. This facilitates the formation of the dew condensation prevention portions.

Also, if the size of the dew condensation suppression member 29 is greater than the space between the boundaries K1, K2, the dew condensation suppression member 29 would float from the inner surface 18a of the first wall portion 18, or if provided between wall portions, the dew condensation suppression member 29 could create a crevice in the air passage 17a. This embodiment eliminates such disadvantages.

In this embodiment, to improve the heat insulation property of the first wall portion 18, the dew condensation suppression member 29 is adhered to a predetermined section of the inner surface 18a of the first wall portion 18 to form a dew condensation suppression portion. Therefore, unlike the formation of the dew condensation suppression portions discussed in the prior art section, the present invention causes no problems that accompany the formation of a dew condensation suppression portion (increased manufacturing costs, waste of material, complication of the procedures). That is, in the present embodiment, dew condensation on the surface of the first wall portion 18 is suppressed by a simple procedure in which the dew condensation suppression member 29 is adhered to a predetermined section of a molded automobile interior part (the first wall portion 18).

In this embodiment, when only one of the spaces S1, S2 is considered, the dew condensation suppression member 29, which is adhered to the inner surface 18a of the first wall portion 18, needs to have a thickness that is greater than the width of the one of the spaces S1, S2 by a predetermined amount (1 mm). When both of the spaces S1, S2 are considered, the dew condensation suppression member 29 needs to have a thickness that is greater than the sum of the widths of the spaces S1, S2 by a predetermined amount (2 mm). That is, the thickness of the dew condensation suppression member 29 is determined taking consideration of the size of the spaces and in terms of obtaining a satisfactory heat insulating property. Therefore, dew condensation on the surface of the first wall portion 18 is reliably suppressed. In other words, dew condensation on the surface of the side panel 13 is reliably suppressed.

The thickness of the dew condensation suppression member 29 is greater than or equal to 3 mm and less than 10 mm. This guarantees both of a sufficient size of the air passage 17a and a satisfactory heat insulation property. Thus, the flow of conditioned air from the air conditioner is not hindered, and the heat insulation property of the side panel 13 is effectively maintained.

The width of each of the spaces S1, S2 is less than or equal to 5 mm. Therefore, the procedure for adhering the dew condensation suppression member 29 to the inner surface 18a of the first wall portion 18 is facilitated while improving the heat insulating property of the first wall portion 18.

The first rib 21 and the second rib 22, which form part of the air-conditioning duct 17, are integrally formed with the side panel 13 (the first wall portion 18). Therefore, the width w2 of the air-conditioning duct 17 is determined in advance and is not changed significantly. Based on the relationship between the width w2 of the air-conditioning duct 17 and the width w1 of the dew condensation suppression member 29, the thickness of the dew condensation suppression member 29 is easily selected such that the expression (1) is satisfied. Thus, dew condensation on the surface of the side panel 13 is reliably suppressed.

Both of the first rib 21 and the second rib 22 project from the side panel 13, and the width w2 of the air-conditioning duct 17 is determined by the first rib 21 and the second rib 22. This structure is advantageous in suppressing dew condensation on the side panel 13. Further, through the minimum procedure, in which the side panel 13 is attached to the container member 12, the air-conditioning duct 17 is formed inside the console box 11, while suppressing dew condensation.

The dew condensation suppression member 29 is formed of resin foam. This improves the heat insulating property of the side panel 13, and suppresses dew condensation on the surface.

The dew condensation suppression member 30 is adhered to the entire section of the side wall 12a that is exposed to the air passage 17a. This prevents the heat insulating property of the side wall 12a is prevented from being degraded. Thus, dew condensation on the outer surface of the container member 12 is suppressed.

The dew condensation suppression member 30 is arranged such that a space S1, S2 exists between the member 30 and each of the third rib 24 and the fourth rib 25. This facilitates the adhering procedure of the dew condensation prevention member 30.

EXAMPLES

Figure 5:
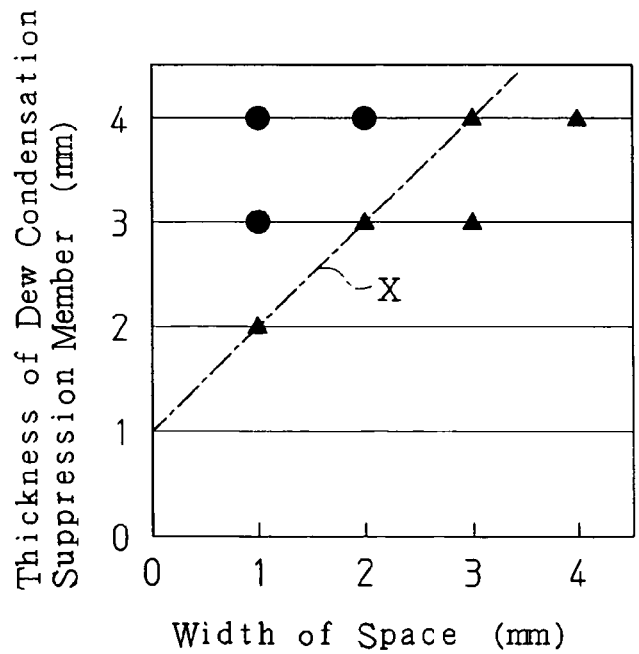
FIG. 5 is a graph showing the presence and absence of dew condensation when the width of a space and the thickness of a dew condensation member are varied.

In this example, in order to prove that dew condensation on the surface of the side panel 13 is suppressed according to the correlation between the thickness of the dew condensation suppression member 29 and the widths of the spaces, dew condensation on the surface of the side panel 13 was visually observed while varying the thickness of the dew condensation suppression member 29 and the widths of the spaces. That is, the console box 11 according to the above embodiment was placed in a constant temperature bath of 50° C. of temperature and 80% of humidity. Then, air was blown into the air passage 17a (temperature: 15° C., flow rate: 100 m$^3$/h). In this state, presence and absence of dew condensation on the side panel 13 were visually observed. The results are shown in table 1 and FIG. 5. In this case, the relationship between the space S1, which is one of the spaces S1, S2, and the thickness of the dew condensation suppression member 29 was considered. In FIG. 5, symbol ● represents the absence of dew condensation, and symbol ▲ represents the presence of dew condensation.

TABLE 1

| Width d of Space S1 | Thickness T (mm) of Dew Condensation Suppression Member | Presence or Absence of Dew Condensation |
|---|---|---|
| 1 | 2 | Present |
| 1 | 3 | Absent |
| 1 | 4 | Absent |
| 2 | 3 | Present |
| 2 | 4 | Absent |
| 3 | 3 | Present |
| 3 | 4 | Present |
| 4 | 4 | Present |

As shown in FIG. 5, in the range above a straight line X (T=d+1), no dew condensation was observed. Therefore, if the thickness T of the dew condensation suppression member 29 satisfies the expression T>d+1 mm (d: width of the space S1>0 mm), dew condensation on the surface of the side panel 13 is suppressed.

Modifications

The preferred embodiment may be modified as described below.

In the illustrated embodiment, both of the first rib 21 and the second rib 22, which form part of the air-conditioning duct 17, extend from the side panel 13 (the first wall portion 18). However, one of these may be formed to project from the side wall 12a of the container member 12. Alternatively, both of the first rib 21 and the second rib 22 may be formed to project from the side wall 12a of the container member 12.

In this embodiment, the dew condensation suppression member 29 is arranged such that a first space S1 and a second space S2 are defined between the member 29 and the boundary lines K1, K2, respectively. However, the dew condensation suppression member 29 may be arranged such that a space exists between the member 29 and only one of the boundary lines K1, K2. For example, if a space exists only between the boundary line K1 and the dew condensation suppression member 29, the lower edge of the member 29 is aligned with the boundary line K2. On the other hand, if a space exists only between the boundary line K2 and the dew condensation suppression member 29, the upper edge of the member 29 is aligned with the boundary line K1.

In the illustrated embodiment, the dew condensation suppression member 29 is adhered to a predetermined section of the first wall portion 18 to form the dew condensation suppression portion. The dew condensation suppression portion may be formed of a foam layer made through sandwich molding.

Both of the first rib 21 and the second rib 22 may be formed separately from the side panel 13. In this case, both of the first rib 21 and the second rib 22 are welded to the side panel 13 and the container member 12 to form the air-conditioning duct 17.

In the illustrated embodiment, the air-conditioning duct 17 has a rectangular cross-section. However, the air-conditioning duct 17 may have a triangular or semicircular cross-section. In this case, the shapes and the number of wall portions forming the air passage 17a are changed.

In the illustrated embodiment, the dew condensation suppression member 30 is adhered to the entire section of the side wall 12a of the container member 12 that is exposed to the air passage 17a. Alternatively, the dew condensation suppression member 30 may be separated from both of the first rib 21 and the second rib 22. In this case, the thickness T of the dew condensation suppression member 30 is determined to satisfy expression (1).

Means for adhering the dew condensation suppression member 29 to the side panel 13 and the container member 12 is not limited to two sided tapes, but may be, for example, an adhesive.

The third rib 24 and the fourth rib 25 of the container member 12 may be omitted.

The dew condensation suppression member 30, which is adhered to the side wall 12a of the container member 12, may be omitted.

An automobile interior part to which the air-conditioning duct 17 according to the present invention is applied is not limited to a console box, but may be, for example, an instrument panel, a roof panel, or a pillar garnish.

Therefore, the present examples and embodiments are to be considered as illustrative and not restrictive and the invention is not to be limited to the details given herein, but may be modified within the scope and equivalence of the appended claims.

The invention claimed is:

1. An air-conditioning duct provided inside an automobile interior part that has an ornamental portion, the duct having an air passage for conducting conditioned air from an air conditioner to a passenger compartment, the duct comprising:

a plurality of wall portions defining the air passage, one of the wall portions being a first wall portion that is formed by the ornamental portion, each wall portion having an inner surface exposed to the interior of the air passage, wherein a pair of boundary lines are defined on the inner surface of the first wall portion at boundaries between the first wall portion and two of the other wall portions that are connected to the first wall portion; and a dew condensation suppression portion provided on the inner surface of the first wall portion between the pair of the boundary lines, a space being defined between the dew condensation suppression portion and at least one of the boundary lines, wherein the space is continuous along the thickness of the dew condensation suppression portion and is located outside of the dew condensation suppression portion, wherein, when the thickness of the dew condensation suppression portion is expressed by T (mm), and the width of the space is expressed by d (mm), the thickness T and the width d satisfy the following expression (1), $$T > d+1 \text{ mm} (5 \text{ mm} \geq d > 0 \text{ mm}) \qquad (1)$$

wherein the thickness of the dew condensation suppression portion is greater than or equal to 3 mm and less than 10 mm.

2. The air-conditioning duct according to claim 1, wherein a space is defined between the dew condensation suppression portion on the inner surface of the first wall portion and each boundary line, wherein, when the sum of the widths of the spaces is expressed by D (mm), the thickness T and the sum D of the widths D satisfy the following expression (2)

$$T \geq D+2 \text{ mm} (D > 0 \text{ mm}) \qquad (2).$$

3. The air-conditioning duct according to claim 1, wherein the dew condensation suppression portion is adhered to the inner surface of the first wall portion.

4. The air-conditioning duct according to claim 1, wherein the dew condensation suppression portion is formed of resin foam.

5. The air-conditioning duct according to claim 1, wherein the automobile interior part is a console box that has a boxlike container body and a pair of side panels each provided on a side of the container body, wherein the ornamental portion is one of the side panels of the console box, and wherein the first wall is formed by the one of the side panels.

6. The air-conditioning duct according to claim 5, wherein the wall portions include a second wall portion arranged to be opposed to the first wall portion, a third wall portion located between the first wall portion and the second wall portion, and a fourth wall portion located between the first wall portion and the second wall portion, the fourth wall portion being opposed to the third wall portion, wherein the second wall portion is formed by the container body, and wherein the third wall portion and the fourth wall portions are formed by ribs projection from one of the side panel or the container body.

7. An air-conditioning duct provided inside an automobile interior part that has an ornamental portion, the duct having an air passage for conducting conditioned air from an air conditioner to a passenger compartment, the duct comprising:

a plurality of wall portions defining the air passage, wherein the wall portions include a first wall portion formed by the ornamental portion, a second wall portion arranged to be opposed to the first wall portion, a third wall portion located between the first wall portion and the second wall portion, and a fourth wall portion located between the first wall portion and the second wall portion, the fourth wall portion being opposed to the third wall portion, wherein each wall portion has an inner surface exposed to the interior of the air passage, and wherein a pair of boundary lines are defined on the inner surface of the first wall portion at boundaries between the first wall portion and the third and fourth wall portions;

a dew condensation suppression portion provided on the inner surface of the first wall portion between the pair of the boundary lines, a space being defined between the dew condensation suppression portion and each boundary line, wherein each space is continuous along the thickness of the dew condensation suppression portion and is located outside of the dew condensation suppression portion; and a dew condensation suppression portion provided on the inner surface of the second wall portion, wherein, when the thickness of the dew condensation suppression portion on the first wall portion is expressed by T (mm), and the sum of the widths of the spaces is expressed by D (mm), the thickness T and the sum D of the widths satisfy the following expression (1), $$T \geq D+2 \text{ mm} (10 \text{ mm} \geq D > 0 \text{ mm}) \tag{1}$$

wherein the thickness of the dew condensation suppression portion is greater than or equal to 3 mm and less than 10 mm.

* * * * *